(12) United States Patent
Zemskov (10) Patent No.: US 11,066,843 B2
(45) Date of Patent: Jul. 20, 2021

(54) CANOPY ASSEMBLY

(71) Applicant: Radio Flyer Inc., Chicago, IL (US)

(72) Inventor: Igor Zemskov, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 16/858,841

(22) Filed: Apr. 27, 2020

(65) Prior Publication Data

US 2020/0340267 A1    Oct. 29, 2020

Related U.S. Application Data

(60) Provisional application No. 62/839,000, filed on Apr. 26, 2019.

(51) Int. Cl.
| | | |
|---|---|---|
| *E04H 15/06* | (2006.01) | |
| *B62B 9/14* | (2006.01) | |
| *B62B 5/00* | (2006.01) | |
| *E04H 15/58* | (2006.01) | |
| *B62B 3/00* | (2006.01) | |

(52) U.S. Cl.
CPC ........... *E04H 15/06* (2013.01); *B62B 5/0013* (2013.01); *B62B 9/145* (2013.01); *E04H 15/58* (2013.01); *B62B 3/007* (2013.01)

(58) Field of Classification Search
CPC ....... B62B 9/142; B62B 9/145; B62B 5/0013; E04H 15/02
USPC .......................................................... 135/903
See application file for complete search history.

(56) References Cited

U.S. PATENT DOCUMENTS

| | | | | |
|---|---|---|---|---|
| 2,539,951 A | * | 1/1951 | Hall | B62B 9/145 |
| | | | | 296/102 |
| 2,826,523 A | * | 3/1958 | Blaszkowski | B29C 53/04 |
| | | | | 428/12 |
| 2,942,794 A | * | 6/1960 | Huso | B60J 11/00 |
| | | | | 242/397 |
| 3,848,821 A | * | 11/1974 | Scheel | E04H 15/26 |
| | | | | 242/899 |
| 4,480,652 A | * | 11/1984 | Gooch | B63B 17/02 |
| | | | | 135/88.01 |
| 5,927,793 A | * | 7/1999 | McGrath, Jr. | B64F 1/005 |
| | | | | 114/361 |
| 6,260,566 B1 | * | 7/2001 | LaFave | B62J 17/08 |
| | | | | 135/88.01 |
| 6,607,235 B2 | * | 8/2003 | McGrath, Jr. | B60J 11/00 |
| | | | | 135/88.09 |
| 6,981,509 B2 | * | 1/2006 | Sharapov | B60J 11/02 |
| | | | | 114/361 |
| 8,752,880 B1 | * | 6/2014 | Morazan | B60J 11/00 |
| | | | | 296/97.1 |

(Continued)

*Primary Examiner* — David R Dunn
*Assistant Examiner* — Danielle Jackson
(74) *Attorney, Agent, or Firm* — Barnes & Thornburg LLP (57) ABSTRACT

A canopy assembly is provided for a ride-on vehicle, such as a wagon. The canopy assembly has a canopy, a support structure and a connecter assembly. The support structure may have longitudinal springs secured to the canopy that can transition between a coiled orientation and a rigid extended orientation to transition the canopy assembly between a use position and a folded or coiled position. The support structure may also have rigid members at opposite ends of the canopy. The connector assembly may have a plurality of connectors secured to the canopy and adapted to operably receive a canopy pole.

17 Claims, 5 Drawing Sheets

(56) References Cited

U.S. PATENT DOCUMENTS

| | | | | |
|---|---|---|---|---|
| 9,004,088 | B1* | 4/2015 | Nicheporuck | B60J 11/04 |
| | | | | 135/115 |
| 9,085,311 | B1* | 7/2015 | Chen | B62B 5/0013 |
| 9,145,154 | B1* | 9/2015 | Horowitz | B62B 7/008 |
| 9,815,355 | B2* | 11/2017 | Byrne | B60J 7/106 |
| 9,956,981 | B1* | 5/2018 | Fitzwater | E04H 15/64 |
| 10,040,470 | B1* | 8/2018 | Horowitz | B62B 3/007 |
| 10,232,696 | B1* | 3/2019 | Lovisetto | E04H 15/06 |
| 10,654,350 | B1* | 5/2020 | Lovisetto | E04H 15/06 |
| 10,676,117 | B2* | 6/2020 | Fitzwater | E04H 15/60 |
| 2004/0178618 | A1* | 9/2004 | Rhea | B60J 11/00 |
| | | | | 280/770 |
| 2005/0045284 | A1* | 3/2005 | Ullyett | E06B 9/24 |
| | | | | 160/238 |
| 2011/0061701 | A1* | 3/2011 | Perez | A47C 29/003 |
| | | | | 135/96 |
| 2018/0118246 | A1* | 5/2018 | Fitzwater | E04H 15/54 |
| 2019/0256124 | A1* | 8/2019 | Fitzwater | B62B 5/082 |

* cited by examiner

CANOPY ASSEMBLY

CROSS-REFERENCE TO RELATED APPLICATIONS

This application claims the benefit of U.S. Provisional Patent Application No. 62/839,000 filed Apr. 26, 2019, which is expressly incorporated herein by reference and made a part hereof.

FEDERALLY SPONSORED RESEARCH OR DEVELOPMENT

Not Applicable.

TECHNICAL FIELD

The present disclosure relates generally to a canopy assembly, and more specifically to a folding canopy assembly, including a self-folding canopy assembly, for a ride on toy, such as a wagon.

BACKGROUND

Typically, when riding in ride-on vehicles, such as wagons, children are exposed to weather elements, including the sun. It is commonly understood that young children can be easily harmed by sunburns and other damaging effects of the sun. As such, parents typically provide suitable clothing for their children, such as long sleeve shirts and hats, to minimize their exposure to the sun. However, in particularly hot and humid climates, long sleeve shirts and hats can be very uncomfortable, thereby triggering other health issues such as heat exhaustion. Parents also typically apply sunscreens on their children, which help to provide protection against the potentially harmful effects ultraviolet rays. Because parents know that the effectiveness of sunscreens does not last, they tend to reapply them on their children's skin on a regular basis. Unfortunately, sunscreens fail to provide sufficient skin protection when long periods of sun exposure are involved.

In order to overcome the above-discussed sun exposure issues when children are seated in standard wagons, canopies attachable to wagons were developed. Canopies on wagons also provide benefit should users get caught in the rain unexpectedly. However, a wagon canopy is typically adapted to be attached to a canopy frame through a number of cross support members that are joined to each other and to a number of vertical support members or poles. As such, this canopy may not collapse well for storage and transport. Additionally, other canopies require special attachment mechanisms to connect the canopy poles and frame to the wagon body. While such canopy systems according to the prior art provide a number of advantages, they nevertheless have certain limitations, including often having complex frames and attachment systems. Accordingly, there is a need for a canopy assembly that can be quickly and easily assembled, and which is simple to use. The present disclosure seeks to overcome certain of these limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology generally relates to a folding canopy assembly for a ride on toy, such as a wagon.

The disclosed subject technology further relates to a canopy assembly for a ride-on vehicle, comprising: a top panel having a first side and a second side, a first edge, a second edge opposing the first edge, a third edge, and a forth edge opposing the third edge; a first support secured to the second side of the top panel adjacent the first edge of the top panel to create a first cavity between the first support and the top panel; a second support secured to the second side of the top panel adjacent the second edge of the top panel to create a second cavity between the second support and the top panel; a third support secured to the second side of the top panel adjacent the third edge of the top panel to create a third cavity between the third support and the top panel; a fourth support secured to the second side of the top panel adjacent the fourth edge of the top panel to create a fourth cavity between the fourth support and the top panel; a first longitudinal spring retained within the first cavity; a second longitudinal spring retained within the second cavity, wherein the first and second longitudinal springs have a concave cross section with an apex of the first and second longitudinal springs being positioned adjacent the second side of the top panel, and wherein the first and second longitudinal springs can transition between a coiled orientation and a rigid extended orientation; a first rigid member retained within the third cavity; a second rigid member retained within the fourth cavity; a skirt extending distally from a perimeter of the top panel about the first, second, third and fourth edges; and, a plurality of connectors secured to the top panel of the canopy assembly, the connectors adapted to operably receive a canopy pole.

The disclosed subject technology further relates to a canopy assembly for a ride-on vehicle, comprising: a canopy having a first side and a second side, a first edge, a second edge, a third edge and a forth edge; a first longitudinal spring secured to the canopy adjacent the first edge of the canopy; a second longitudinal spring secured to the canopy adjacent the second edge of the canopy, wherein the first and second longitudinal springs can transition between a coiled orientation and a rigid extended orientation to transition the canopy assembly between a use position and a folded or coiled position; a first rigid member secured to the canopy adjacent the third edge of the canopy; a second rigid member secured to the canopy adjacent the fourth edge of the canopy; a plurality of connectors secured to the canopy of the canopy assembly, the connectors adapted to operably receive a canopy pole.

The disclosed subject technology further relates to a canopy assembly for a ride-on vehicle, comprising: a canopy; a support structure connected to the canopy to retain the canopy in an open or use position, and wherein the support structure can fold the canopy into a coiled position; and, a connector assembly connected to the canopy to connect the canopy to the ride-on vehicle.

The disclosed subject technology further relates to canopy assembly wherein the top panel and the skirt comprise a canopy, and further comprising straps connected to the canopy to assist in retaining the canopy in a coiled position.

The disclosed subject technology further relates to canopy assembly wherein the canopy assembly has four connectors, and wherein one connector is provided at each corner of the canopy assembly.

The disclosed subject technology further relates to canopy assembly wherein the first longitudinal spring and the second longitudinal spring extend from substantially adjacent the third edge to substantially adjacent the fourth edge.

The disclosed subject technology further relates to canopy assembly wherein the first rigid member and the second rigid member extend from substantially adjacent the first edge to substantially adjacent the second edge.

The disclosed subject technology further relates to canopy assembly wherein the first and second longitudinal springs automatically coil upon initiation by a user.

The disclosed subject technology further relates to canopy assembly wherein the first and second longitudinal springs can be uncoiled by a user and snapped into a generally rigid longitudinally extended orientation to retain the canopy assembly in an open or use position.

The disclosed subject technology further relates to canopy assembly comprising a first support secured to the canopy adjacent the first edge of the canopy to create a first cavity between the first support and the canopy, and a second support secured to the second side of the canopy adjacent the second edge of the canopy to create a second cavity between the second support and the canopy, wherein the first longitudinal spring is positioned within the first cavity, and wherein the second longitudinal spring is positioned within the second cavity.

The disclosed subject technology further relates to canopy assembly comprising a third support secured to the second side of the canopy adjacent the third edge of the canopy to create a third cavity between the third support and the canopy, and a fourth support secured to the second side of the canopy adjacent the fourth edge of the canopy to create a fourth cavity between the fourth support and the canopy, wherein the first rigid member is positioned within the third cavity and wherein the second rigid member is positioned within the fourth cavity.

The disclosed subject technology further relates to canopy assembly wherein the first and second longitudinal springs have a concave cross section.

The disclosed subject technology further relates to canopy assembly wherein the canopy comprises a top panel and a skirt.

The disclosed subject technology further relates to canopy assembly wherein the skirt extends distally from a perimeter of the top panel.

The disclosed subject technology further relates to canopy assembly wherein the support structure comprises a plurality of automatically coiling longitudinal spring members secured to the canopy about a length of the canopy.

The disclosed subject technology further relates to canopy assembly wherein the support structure further comprises a plurality of rigid members connected adjacent opposing ends of the canopy, the rigid members being generally perpendicular to the longitudinal spring members.

The disclosed subject technology further relates to canopy assembly wherein the automatically coiling longitudinal spring members have a concave cross section.

It is understood that other configurations and embodiments of the subject technology will become readily apparent to those skilled in the art from the following detailed description, wherein various configurations of the subject technology are shown and described by way of illustration. As will be realized, the subject technology is capable of other and different configurations, and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law. Moreover, it is noted that like reference numerals represent similar parts throughout the several views of the drawings of the disclosure.

Figure 1:
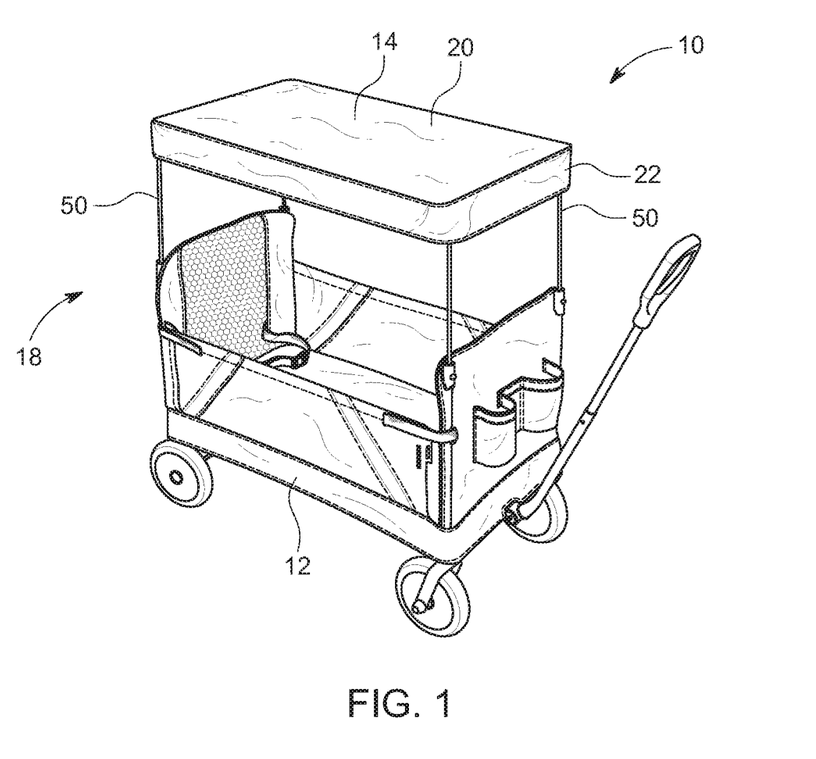
FIG. 1 is a perspective view of a foldable canopy assembly according to one embodiment, connected to a wagon.
Figure 2:
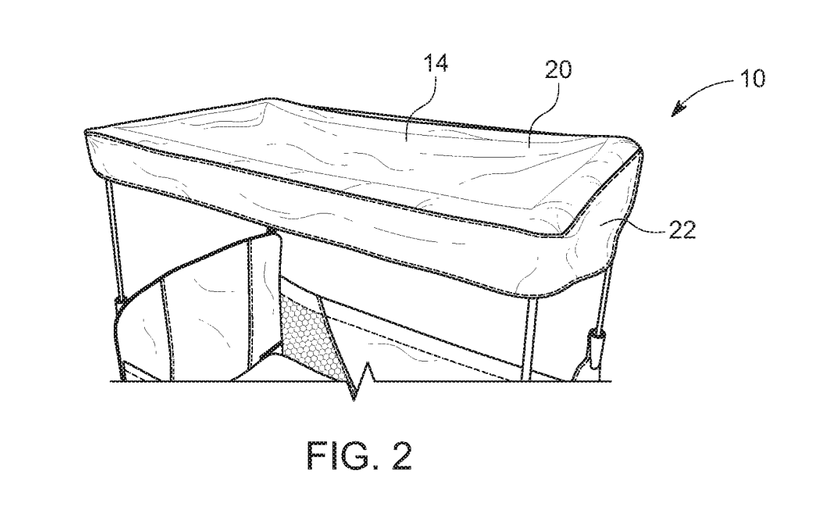
FIG. 2 is another perspective view of the foldable canopy assembly of FIG. 1.

Referring now to the figures, and specifically to FIGS. 1 and 2, there is shown one embodiment of a canopy assembly 10 for a ride-on vehicle 12, such as a wagon 12. In one embodiment, the canopy assembly 10 generally comprises a canopy 14, a support/folding structure 16, and a connector assembly 18. The connector assembly 18 of the canopy assembly 10 can be easily secured to supports, such as canopy poles 50, from the ride-on vehicle 12.

As shown in FIGS. 1 and 2, in one embodiment the canopy 14 generally comprises an elongated top panel 20 and a side panel or skirt 22. The side panel or skirt 22 is preferably secured to the perimeter of the top panel 20 and extends distally from a perimeter of the top panel 20. In one embodiment, the top panel 20 has a first side 17, a second side 19, a first edge 21, a second edge 23 opposing the first edge 21, a third edge 25, and a forth edge 27 opposing the third edge 25. In one embodiment the top panel 20 and side panels 22 are made of fabric, however, they may be made of alternate material such as plastic. Additionally, see-through portions (not show) or retractable windows (not shown) may be provided in the top panel 20 and/or the side panel 22. In one embodiment the side panel 22 extends around the entirety of the perimeter of the top panel 20, however, in alternate embodiments the side panel 22 may not extend around the entirety of the perimeter of the top panel 20. In one embodiment, the elongated top panel 20 is configured to cover the ride-on vehicle 12, and the side skirt 22 extends peripherally downward and hangs from elongated top panel 20. In accordance with the present disclosure, canopy 14 may be fabricated with materials that protect children sitting in wagon body 12 from the sun. Moreover, these materials are lightweight, strong, water and wind resistant, so as to provide protection from wind and rain.

Figure 3:
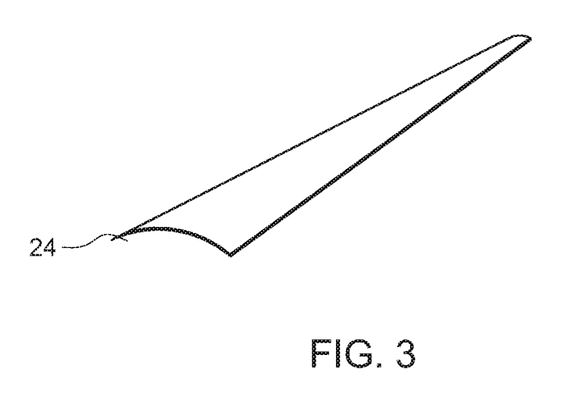
FIG. 3 is a perspective view of a longitudinal spring member for the foldable canopy assembly of FIG. 1, in the open position.

The support/folding structure 16 is connected to the canopy 14 to retain the canopy 14 is an open or use position as shown in FIGS. 1 and 2. Additionally, the support structure 16 can fold the canopy 14 into the coiled position as shown in FIGS. 5-9. In one embodiment, the support structure 16 generally comprises a pair of longitudinal spring members 24, such as a first longitudinal spring 24a and a second longitudinal spring 24b, that operate to maintain the canopy 14 in the open position, as shown in FIGS. 1-3, and also operate to collapse and automatically fold the canopy 14 for storage in the folded position, as shown in FIGS. 4-9. In one embodiment, the spring members 24 have a concave cross-section and are made of a spring steel. In one embodiment, as shown in FIG. 10, an apex of the first and second longitudinal springs 24 is positioned adjacent the second side 19 of the top panel 20. In another embodiment the spring members 24 are automatically coiling longitudinal spring members. The first and second longitudinal springs 24 can transition between a coiled orientation and a rigid extended orientation to transition the canopy assembly 10 between a use position and a folded or coiled position. The spring members 24 may be secured to the top panel 20 about a length of the top panel 20. Preferably, there are two or more spring members 24, the first longitudinal spring member 24a secured to the canopy 14 adjacent the first edge 21 of the top panel 20 of the canopy 14 and the second longitudinal spring member 24b secured to the top panel 20 of the canopy 14 adjacent the second edge 23 of the canopy 14, one adjacent each longitudinal side of the top panel 20. In one embodiment, the first longitudinal spring 24a and the second longitudinal spring 24b extend from substantially adjacent the third edge 25 to substantially adjacent the fourth edge 27 of the canopy 14. The term substantially adjacent dos not require immediate closeness.

Figure 5:
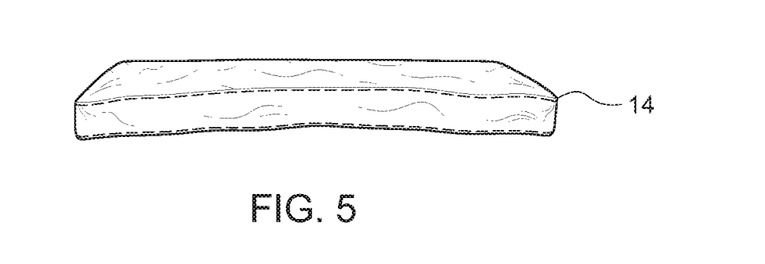
FIG. 5 is a perspective view of the foldable canopy assembly of FIG. 1 in the open position, prior to folding.

Supports 26 or support rails 26 may be provided to secure the spring members 24 to the top panel 20, such as in a clam shell fashion. As such, the spring members 24 may reside in a longitudinal cavity created between the top panel 20 and the support rails 26. Alternately, a bottom panel may be provided to secure the spring members 24 in place. As a further alternate the spring members 24 may be secured in place to the top panel 20 at various locations about the length of the spring members 24. In the open position, as shown in FIGS. 2, 3 and 5, the spring members 24 provide rigidity to the top panel 20 to maintain the canopy 14 in the open position. In one embodiment, as shown in FIG. 10, the supports 26 include a first support 26a secured to the second side 19 of the top panel 20 adjacent the first edge 21 of the top panel 20 to create a first cavity between the first support 26a and the top panel 20, and a second support 26b secured to the second side 19 of the top panel 20 adjacent the second edge 23 of the top panel 20 to create a second cavity between the second support 26b and the top panel 20. In one embodiment, the first longitudinal spring 24a is retained within the first cavity, and the second longitudinal spring 24b is retained within the second cavity.

Additionally, the support structure 16 may further comprise front and rear rigid members 28, 30, also referred to as first and second rigid members 28, 30, to provide side-to-side rigidity to the canopy 14, especially in the open position. In one embodiment the first rigid member 28 is provided about a width of the top panel 20 adjacent the third edge 25 of the top panel 20, and the second rigid member 30 is provided about a width of the top panel 20 adjacent the fourth edge 27 of the top panel 20. Accordingly, the rigid members 28, 30 are generally perpendicular to the spring members 24. In one embodiment the first rigid member 28 and the second rigid member 30 extend from substantially adjacent the first edge 25 to substantially adjacent the second edge 27.

As with the spring members 24, the rigid members 28, 30 may be secured to the top panel 20 with supports 36 or support rails 36, such as fabric support rails, in a clam shell fashion. In one embodiment, as shown in FIG. 10, the supports 36 include a third support 36a secured to the second side 19 of the top panel 20 adjacent the third edge 25 of the top panel 20 to create a third cavity between the third support 36a and the top panel 20, and a fourth support 36b secured to the second side 19 of the top panel 20 adjacent the fourth edge 27 of the top panel 20 to create a fourth cavity between the fourth support 36b and the top panel 20. In one embodiment, the first rigid member 28 is retained within the third cavity adjacent the third edge 25 of the canopy 14, and the second rigid member 30 is retained within the fourth cavity adjacent the fourth edge 27 of the canopy 14. One purpose of the rigid members 28, 30 is to provide side-to-side rigidity to the canopy 14, especially when the canopy 14 is in the open configuration and secured to the wagon 12, as shown in FIGS. 1 and 2, as well as when the canopy 14 is coiled or folded as shown in FIG. 9.

Figure 4:
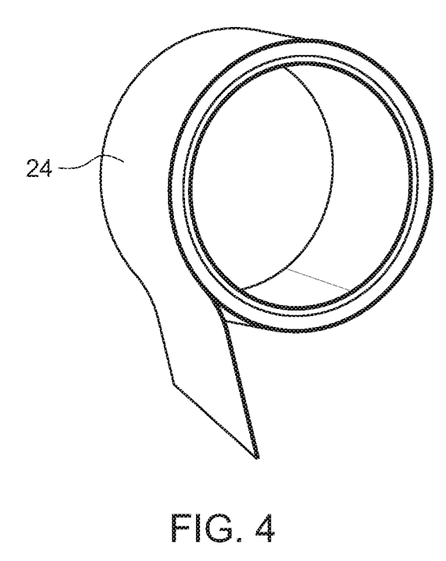
FIG. 4 is a perspective view of a longitudinal spring member for the foldable canopy assembly of FIG. 1, in the folded position
Figure 6:
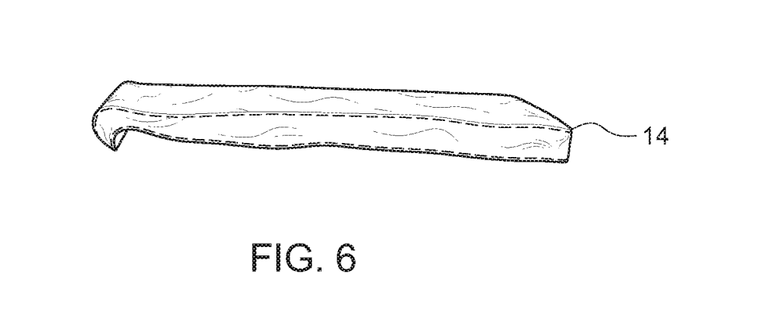
FIG. 6 is a perspective view of the foldable canopy assembly of FIG. 1, in the phase to initiate folding.
Figure 7:
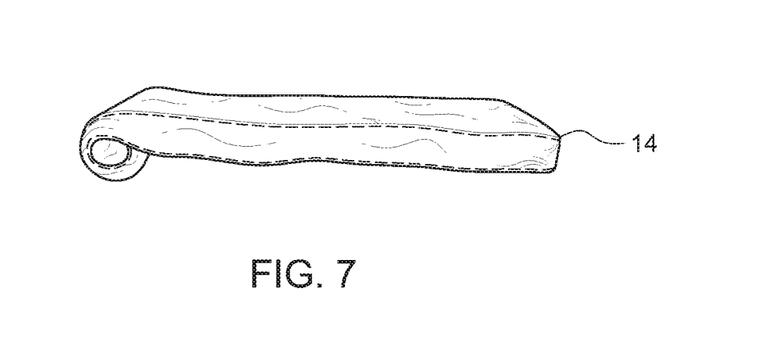
FIG. 7 is a perspective view of the foldable canopy assembly of FIG. 1, in the next phase of folding following the initiation of folding.
Figure 8:
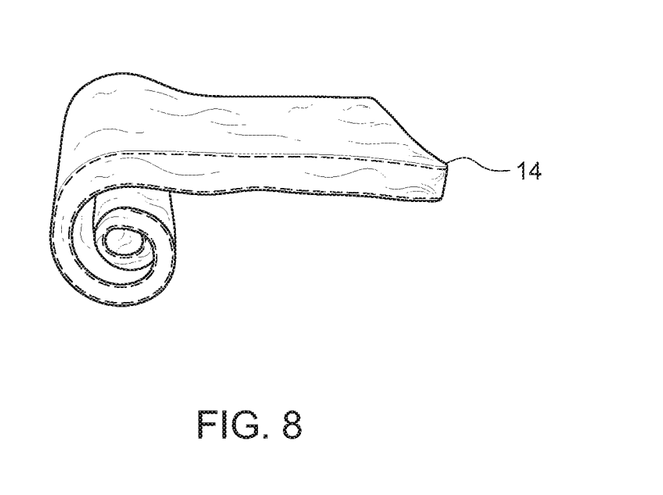
FIG. 8 is a perspective view of the foldable canopy assembly of FIG. 1, as the canopy is folded.

As shown in FIG. 3, in the extended or open position, the spring members 24 are fairly rigid about their length. In one embodiment, as shown in FIGS. 3 and 4, the spring members 24 preferably have a concave cross section. Further, in one embodiment the end of the spring members 24 may be somewhat curled up in the open position to assist in retaining the spring member 24 in the open position. When the spring member 24 is bent in the direction of the concave curvature of the spring member 24, the spring member 24 automatically coils as shown in FIG. 4. Therefore, when the spring members 24 are attached to the canopy 14, they assist in creating a canopy 14 that can be rigidly retained in the extended or open position, as shown in FIG. 5, and then when the user desires to fold the canopy 14, the user can bend, preferably in a snap manner, the end of the canopy 14 downwardly, which is in the direction of the concave curvature of the spring members 24 of the canopy assembly 10, as shown in FIG. 6, to begin the automatic coiling function. Once the end of the canopy assembly 10, with the spring members 24, is bent downwardly in the direction of the concave curvature of the spring members 24, the spring members 24 will automatically coil the canopy 10 as shown in FIG. 8 until the canopy 10 is fully coiled as shown in folded position of FIG. 9. The canopy assembly 10 may include various straps 40 and/or VELCRO® mechanisms 42 to assist in retaining the canopy assembly 10 in the coiled or folded position.

Figure 9:
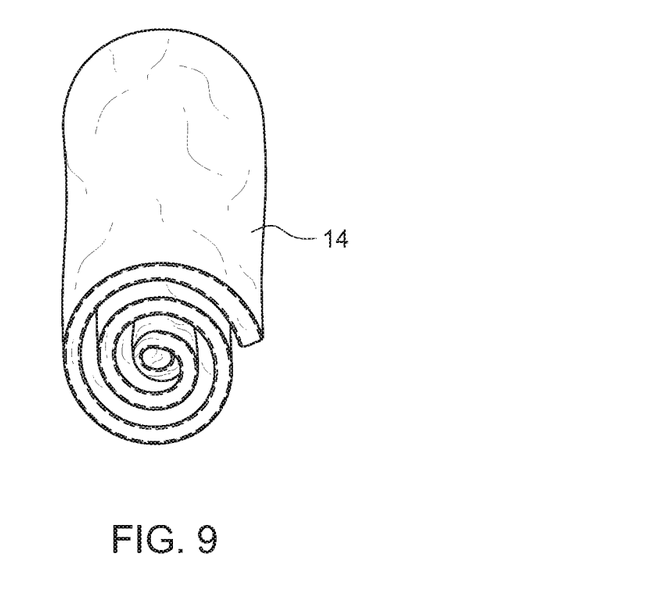
FIG. 9 is a perspective view of the foldable canopy assembly of FIG. 1, in the fully folded configuration.
Figure 10:
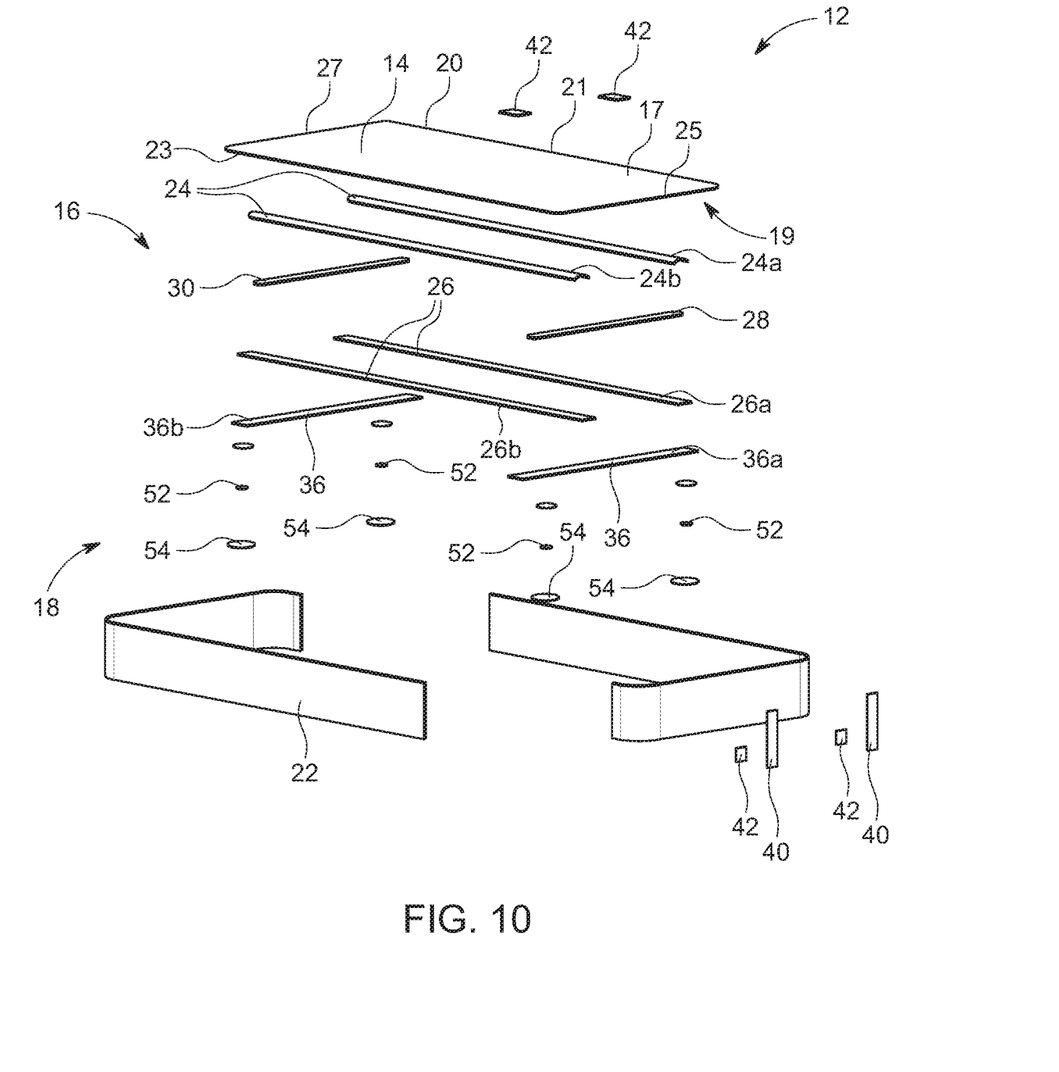
FIG. 10 is an exploded view of one embodiment of the foldable canopy assembly.

To transition the canopy assembly 10 from the coiled or folded position shown in FIG. 9 to the open position shown in FIGS. 1-3, the user unrolls the canopy 14 and snaps the spring members 24 so that they are straight and not bent about their concave cross section, as shown in FIG. 3. When this occurs the canopy 14 will be retained in the open position, as shown in FIGS. 1, 2 and 5, until the spring members 24 are bent downwardly as explained above.

The canopy assembly 10 may also include a connector assembly 18 to removably secure the canopy assembly 10 to the wagon 12, and preferably to support members 50 extending from the wagon 12 as shown in FIGS. 1 and 2. As shown in FIG. 10, in one embodiment, the connector assembly 18 comprises a plurality of connectors 52 that are secured to the canopy 14. As shown in FIGS. 1 and 10, four connectors 52 may be provided, one in each corner of the canopy 14. The connectors 52 may be mating members to mate with the support members 50 from the wagon 12. In one embodiment, the connector 52 is a female component and the support members 50 comprise a male snap receiver so that when connected together, the connector 52 and receiver become removably coupled in a press-fit/snapping manner. It is understood, however, that the receiver may be a female component and the connector 52 may be a male component. Additionally, alternate mating configurations are acceptable. The connectors 52 may be secured to the canopy 14 with the use of fabric covers 54.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

Further, the claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A canopy assembly for a ride-on vehicle, comprising:
   a top panel having a first side and a second side, a first edge, a second edge opposing the first edge, a third edge, and a forth edge opposing the third edge;
   a first support secured to the second side of the top panel adjacent the first edge of the top panel to create a first cavity between the first support and the top panel;
   a second support secured to the second side of the top panel adjacent the second edge of the top panel to create a second cavity between the second support and the top panel;
   a third support secured to the second side of the top panel adjacent the third edge of the top panel to create a third cavity between the third support and the top panel;
   a fourth support secured to the second side of the top panel adjacent the fourth edge of the top panel to create a fourth cavity between the fourth support and the top panel;
   a first longitudinal spring retained within the first cavity;
   a second longitudinal spring retained within the second cavity, wherein the first and second longitudinal springs have a concave cross section with an apex of the first and second longitudinal springs being positioned adjacent the second side of the top panel, and wherein the first and second longitudinal springs can transition between a coiled orientation and a rigid extended orientation;
   a first rigid member retained within the third cavity;
   a second rigid member retained within the fourth cavity;
   a skirt extending distally from a perimeter of the top panel about the first, second, third and fourth edges; and,
   a plurality of connectors secured to the top panel of the canopy assembly, the connectors adapted to operably receive a canopy pole.

2. The canopy assembly of claim 1, wherein the top panel and the skirt comprise a canopy, and further comprising straps connected to the canopy to assist in retaining the canopy in a coiled position.

3. The canopy assembly of claim 1, wherein the canopy assembly has four connectors, and wherein one connector is provided at each corner of the canopy assembly.

4. The canopy assembly of claim 1, wherein the first longitudinal spring and the second longitudinal spring extend from substantially adjacent the third edge to substantially adjacent the fourth edge.

5. The canopy assembly of claim 1, wherein the first rigid member and the second rigid member extend from substantially adjacent the first edge to substantially adjacent the second edge.

6. The canopy assembly of claim 1, wherein the first and second longitudinal springs automatically coil upon initiation by a user.

7. The canopy assembly of claim 6, wherein the first and second longitudinal springs can be uncoiled by a user and snapped into a generally rigid longitudinally extended orientation to retain the canopy assembly in an open or use position.

8. A canopy assembly for a ride-on vehicle, comprising:
   a canopy having a first side and a second side, a first edge, a second edge, a third edge and a forth edge;
   a first longitudinal spring secured to the canopy adjacent the first edge of the canopy;
   a second longitudinal spring secured to the canopy adjacent the second edge of the canopy, wherein the first and second longitudinal springs can transition between a coiled orientation and a rigid extended orientation to transition the canopy assembly between a use position and a folded or coiled position, and wherein the first and second longitudinal springs can be uncoiled by a user and snapped into a generally rigid longitudinally extended orientation to retain the canopy assembly in the use or open position;
   a first rigid member secured to the canopy adjacent the third edge of the canopy;
   a second rigid member secured to the canopy adjacent the fourth edge of the canopy;
   a plurality of connectors secured to the canopy of the canopy assembly, the connectors adapted to operably receive a canopy pole.

9. The canopy assembly of claim 8, further comprising a first support secured to the canopy adjacent the first edge of the canopy to create a first cavity between the first support and the canopy, and a second support secured to the second side of the canopy adjacent the second edge of the canopy to create a second cavity between the second support and the canopy, wherein the first longitudinal spring is positioned within the first cavity, and wherein the second longitudinal spring is positioned within the second cavity.

10. The canopy assembly of claim 9, further comprising a third support secured to the second side of the canopy adjacent the third edge of the canopy to create a third cavity between the third support and the canopy, and a fourth support secured to the second side of the canopy adjacent the fourth edge of the canopy to create a fourth cavity between the fourth support and the canopy, wherein the first rigid member is positioned within the third cavity and wherein the second rigid member is positioned within the fourth cavity.

11. The canopy assembly of claim 8, wherein the first and second longitudinal springs have a concave cross section.

12. The canopy assembly of claim 8, wherein the canopy comprises a top panel and a skirt.

13. The canopy assembly of claim 12, wherein the skirt extends distally from a perimeter of the top panel.

14. The canopy assembly of claim 8, wherein the first and second longitudinal springs automatically coil upon initiation by a user.

15. A canopy assembly for a ride-on vehicle, comprising:
- a canopy;
- a support structure connected to the canopy to retain the canopy in an open or use position, and wherein the support structure can fold the canopy into a coiled position; and,
- a connector assembly connected to the canopy to connect the canopy to the ride-on vehicle, wherein the support structure comprises a plurality of automatically coiling longitudinal spring members secured to the canopy about a length of the canopy, and wherein the automatically coiling longitudinal spring members have a concave cross section.

16. The canopy assembly of claim 15, wherein the support structure further comprises a plurality of rigid members connected adjacent opposing ends of the canopy, the rigid members being generally perpendicular to the longitudinal spring members.

17. The canopy assembly of claim 15, wherein the canopy comprises a top panel and a skirt extending downwardly from a perimeter of the top panel.

* * * * *